(12) United States Patent
Kato

(10) Patent No.: US 7,062,990 B2
(45) Date of Patent: Jun. 20, 2006

(54) FOOTREST PLATE AND FOOTREST PLATE MOUNTING ASSEMBLY

(75) Inventor: Hiroyuki Kato, Aichi-ken (JP)

(73) Assignee: Newfrey LLC, Newark, DE (US)

( * ) Notice: Subject to any disclaimer, the term of this patent is extended or adjusted under 35 U.S.C. 154(b) by 4 days.

(21) Appl. No.: 10/805,985

(22) Filed: Mar. 22, 2004

(65) Prior Publication Data

US 2004/0176708 A1   Sep. 9, 2004

Related U.S. Application Data

(63) Continuation of application No. PCT/US02/30658, filed on Sep. 26, 2002.

(30) Foreign Application Priority Data

Sep. 28, 2001 (JP) .............................. 2001-299161

(51) Int. Cl.
  *G05G 1/18* (2006.01)
  *B60N 3/06* (2006.01)

(52) U.S. Cl. .......................................... 74/564; 296/75

(58) Field of Classification Search ................. 74/564; 296/75; 297/423.1, 423.18, 423.39; 180/90.6; 248/351

See application file for complete search history.

(56) References Cited

U.S. PATENT DOCUMENTS 5,738,180 A * 4/1998 Hofmann et al. ............. 74/564
6,220,643 B1 * 4/2001 Kato ........................... 296/75
6,634,694 B1 * 10/2003 Matsushita .................... 296/75
6,910,724 B1 * 6/2005 Kato ........................... 296/75

FOREIGN PATENT DOCUMENTS

| DE | 41 04 123 A1 | 8/1992 |
|----|----|----|
| EP | 0 590 993 A1 | 4/1994 |
| GB | 2 344 569 A | 6/2000 |
| JP | 62-39007 | 3/1987 |
| JP | 1-162847 | 11/1989 |
| JP | 2000-177474 | 6/2000 |
| JP | 2004-230923 | * 8/2004 |

* cited by examiner

*Primary Examiner*—Vinh T. Luong
(74) *Attorney, Agent, or Firm*—Harness, Dickey & Pierce, P.L.C.

(57) ABSTRACT

A footrest plate has a footrest side and a rear side. The rear side includes a pair of clips fixedly received in rectangular shaped mounting holes of a workpiece. The clips have a defined spacing therebetween in a longitudinal direction of the footrest plate and a rectangular cross-sectional insertion portion insertable into the mounting holes. The rear side includes a reference protrusion at an intermediate position between the clips having a defined distance to the clips in the longitudinal direction. The reference protrusion is inserted into a workpiece reference hole. The reference protrusion includes a rectangular cross-section defining a pair of lateral sides each extending in a lateral direction transverse to the longitudinal direction, and a length in the lateral direction greater than each lateral side of the clips.

12 Claims, 6 Drawing Sheets

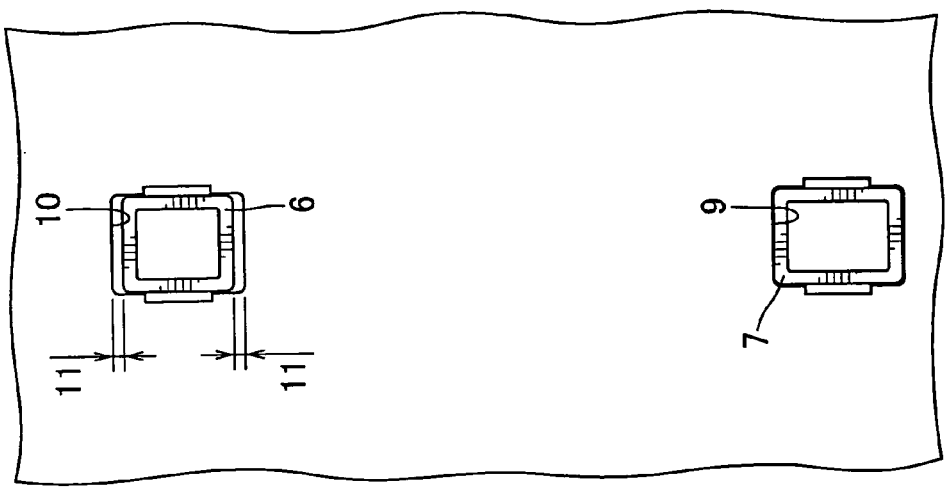
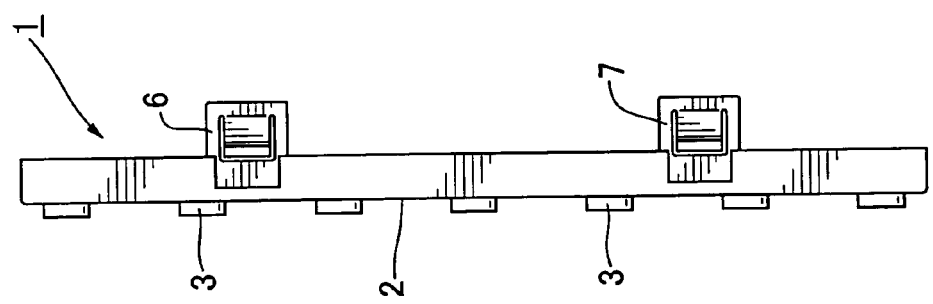
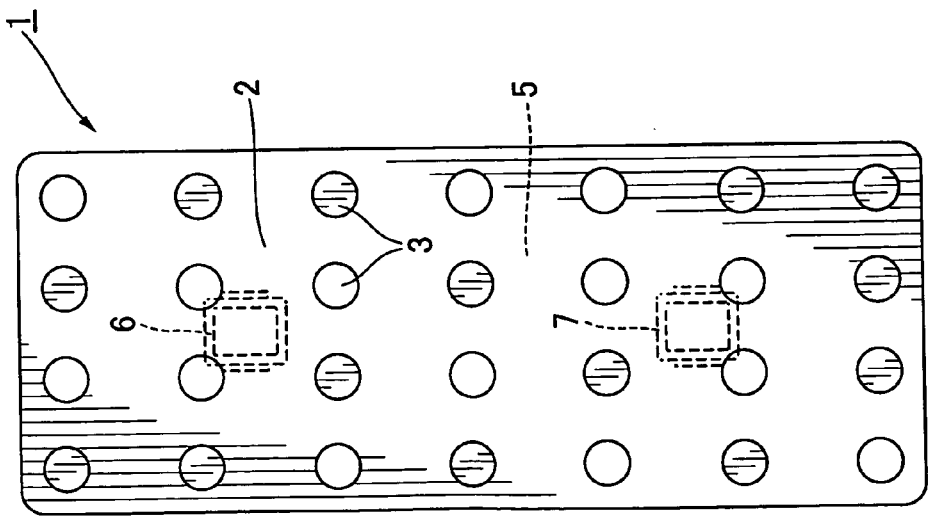

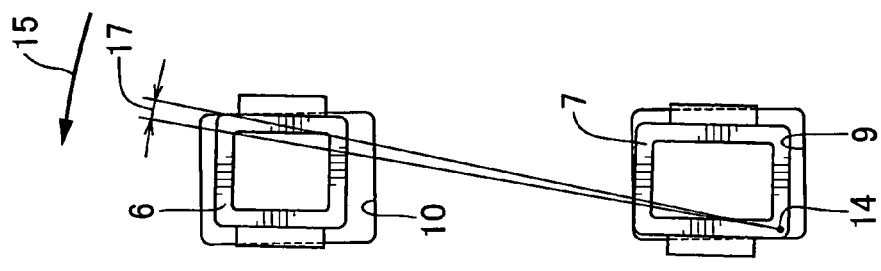
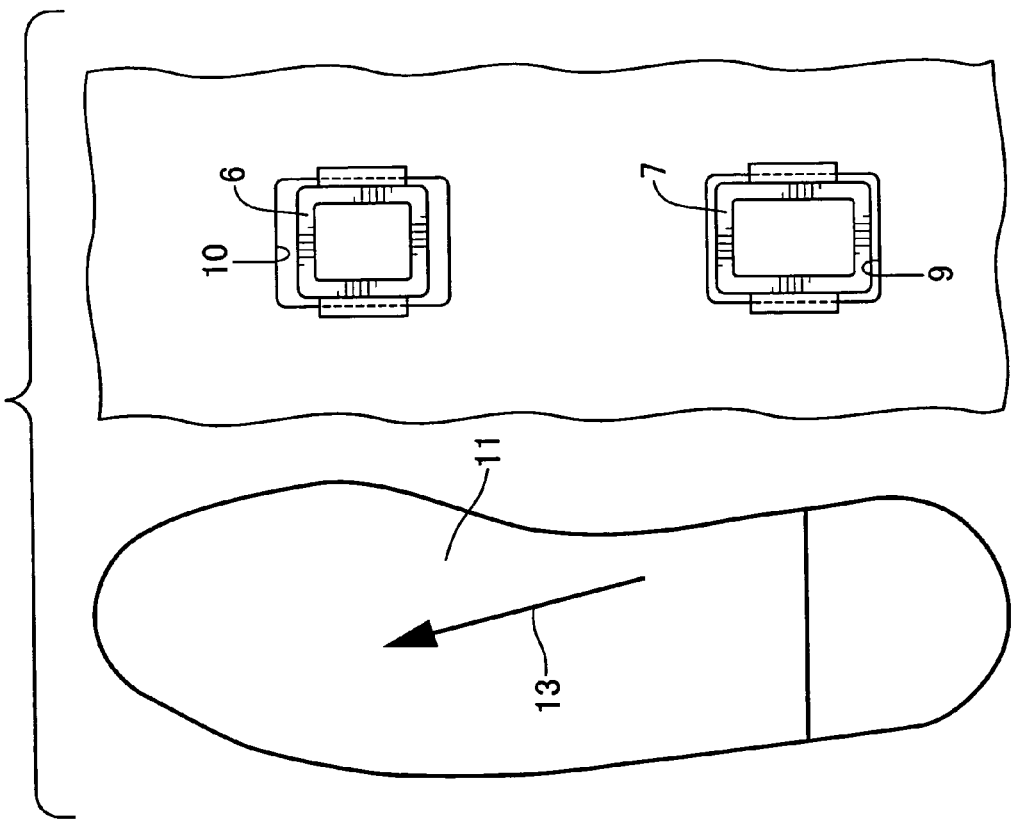

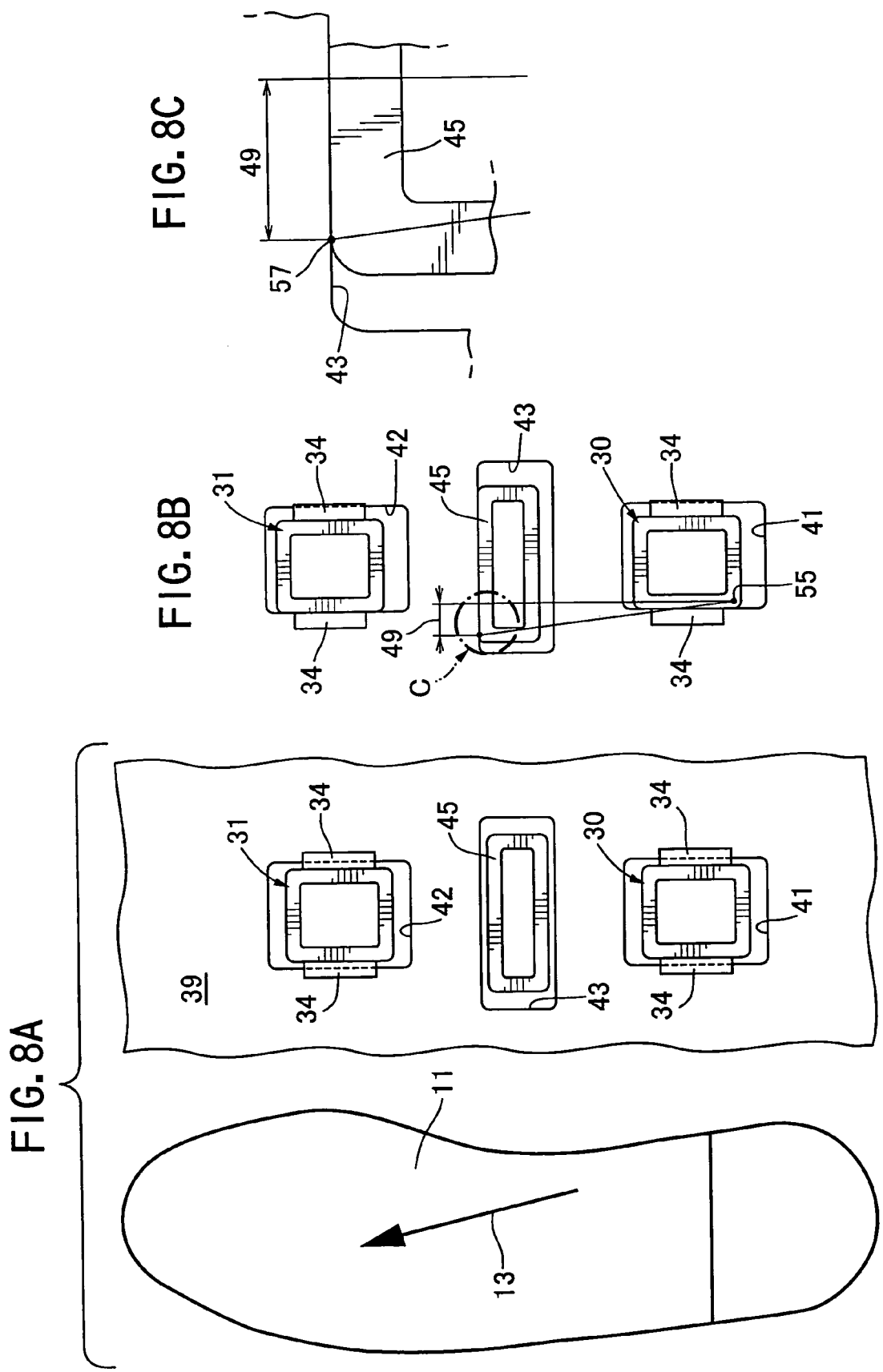

FOOTREST PLATE AND FOOTREST PLATE MOUNTING ASSEMBLY

CROSS-REFERENCE TO RELATED APPLICATIONS

This application is a continuation of International Application No. PCT/US02/30658, filed Sep. 26, 2002. This application claims the benefit of Japanese Application No. 2001-299161, filed Sep. 28, 2001. The disclosure(s) of the above application(s) is (are) incorporated herein by reference.

FIELD OF THE INVENTION

The present invention relates to an elongated footrest plate having a footrest side and a rear side opposite to the footrest side, wherein the rear side is provided with clips to be fixedly received into corresponding mounting holes formed in a workpiece such as a vehicle body or a member fixed to the vehicle body. The present invention also relates to a mounting assembly of such a footrest plate.

BACKGROUND OF THE INVENTION

In a recent assembly line of vehicles or the like, an elongated rectangular-shaped plastic footrest plate is attached to a workpiece such as a vehicle body as often as required. Generally, in order to facilitate the attaching operation of the footrest plate, a pair of mounting holes are formed in the workpiece, and a pair of anchor clips are provides on the rear side opposite to the footrest side of the footrest plate in alignment with the pair of mounting holes. Then, the pair of clips are inserted into the corresponding mounting holes to fix the footrest plate to the workpiece. The pair of mounting holes are formed at predetermined positions of the workpiece with leaving a predetermined distance therebetween. Correspondingly, the pair of clips are provided at predetermined positions of the rear side of the footrest plate with leaving a predetermined distance therebetween.

The respective positions and the distance for the pair of mounting holes should match with those for the pair of clips to allow the clips to be inserted into the corresponding mounting holes. However, complicated processes are required to form the mounting holes and the clips with a high degree of positioning accuracy, which leads to undesirably increased cost. From this point of view, each of the mounting holes is formed with a predetermined positional tolerance, and the clips are formed with a predetermined clearance for compensating a misalignment caused by the tolerance. In a conventional footrest plate, one of the clips is formed as a reference clip, and the other clip is formed smaller by a clearance thereof. In this case, if the attached footrest plate is applied with a heavy load from a driver's foot rested thereon, the region of the footrest plate around the reference clip can be secured, whereas the remaining region around the other clip is displaced by the clearance. This allows the footrest plate to be rotated several or more degrees around the reference clip, and such a rotational movement is repeatedly caused as a consequence of changes of the direction of the load, resulting in undesirable wobbling movement of the footrest plate.

FIGS. 1A to 1C show a conventional footrest plate 1. The footrest plate 1 is composed of an elongated rectangular-shaped plastic plate member. The footrest plate has a front surface serving as a footrest side 2 formed with a number of protrusions 3 for preventing a foot of a driver or the like from slipping. The rear side 5 of the footrest plate opposite to the footrest side 2 is provided with a pair of anchor clips 6 and 7 to be fixedly received into a pair of corresponding mounting holes which are formed in a workpiece such as a vehicle body or a seat member fixed to the vehicle body with protruding from the rear side 5 and leaving a certain distance therebetween. Each of the clips 6 and 7 includes a shank having a rectangular cross-sectional insertion portion in conformity with the corresponding mounting hole of the workpiece formed in a rectangular shape. In the pair of mounting holes, their positioning accuracy and the distance therebetween are designed with predetermined tolerances. Further, one of the clips is formed with a clearance to allow its misalignment caused by the tolerances to be compensated by the cross-sectional dimension of the insertion portion of the shank. As shown in FIG. 1C, according to a conventional footrest plate, one clip 7 is formed as a reference clip having the same dimension as that of the corresponding mounting hole 9, and the shank of the other clip 6 is formed to define a pair of longitudinal sides in cross section each having a length shorter than that of each longitudinal side of the corresponding mounting hole 10 by a clearance 11.

The above conventional footrest plate fastening has an advantage of providing a simple attaching operation in which the footrest plate is attached only by inserting the clips into the mounting holes without any tool. However, the conventional footrest plate fastening can cause undesirable wobbling movement of the footrest plate by a heavy load applied from a foot of a drivers or the like to the footrest plate. This wobbling movement will be described with reference to FIGS. 2A and 2B in which the clips and the mounting holes are enlarged in an exaggerated form, and the respective distances between the clips and between the mounting holes are shorten for the sake of simplicity of descriptions. As shown in FIG. 1A, in the condition after the footrest plate is attached to the workpiece, the clips 6 and 7 are generally located at the illustrated positions in alignment with the corresponding mounting holes 9 and 10. In this condition, when a driver or other passenger braces his/her foot with placing the foot 11 on the footrest plate, a heavy load is applied to the footrest plate 1 in the direction shown by the arrow 13. Then, this load moves the footrest plate by the clearance between each of the clips and the corresponding mounting hole, as shown FIG. 2B. In FIG. 2B, the reference clip 7 is slightly moved to one of the sides of the mounting hole 9 against one of the elastic engagement pawl of the reference clip and fixed thereat, whereas the other clip 6 is rotationally moved with respect to the mounting hole 10 in the direction shown by the arrow 15 around the point 14 in the reference clip 7 according to the clearance 11. When the load from the bracing force of the foot is turned down and the load 13 is reduced, the clip 6 is moved to the center of the mounting hole 10 by the action of the elastic engagement pawls of the clip 6 so as to return the footrest plate to the original position. When the foot is braced again, the footrest plate is re-moved in the direction shown by the arrow 15. As a result, the footrest plate is rotated in the range of the distance 17. Even though this rotational angle is small, the foot of a driver or other passenger is repeatedly wobbled by the rotational movements as a consequence of changes of the load. This is objectionable from a fundamental performance of the footrest plate.

Japanese Utility Model Laid-Open No. 62-39007 discloses a assembly for attaching a molding such as side guard molding to a vehicle body. In this assembly, a plurality of clip are fixed to the molding, and a corresponding number of grommets are fixed to a vehicle body. Then, the clips are inserted into the corresponding grommets to attach the molding to the vehicle body. For allowing the clips to be adequately received into the corresponding grommets even if the distance between the adjacent clips or grommets is varied by dimensional tolerances or thermal expansions, one of the adjacent grommets is arranged to have a longitudinal length greater than that of the other grommet. The assembly described in this publication does not include any suggestion on attachment of a footrest plate. Further, a misalignment caused by tolerances or thermal expansions is compensated by only one grommet. Thus, even if this assembly can be applied to a footrest plate, the aforementioned problem of the rotational or wobbling movement cannot be solved.

Japanese Utility Model Laid-Open No. 01-162847 discloses a assembly for attaching a garnish to a vehicle body. In this assembly, a plurality of clips are fixed to the rear side of the garnish through respective retainers with leaving a predetermined distance therebetween, and a plurality of mounting holes are formed in the vehicle body at corresponding positions with leaving a predetermined distance therebetween. One of the retainers is formed with an L-shaped notch, and each of the remaining retainers is formed with a straight notch extending in one direction. Each of these notches has an opening through which the clip is detachably received. The clip received in the L-shaped notch is held by the corresponding mounting hole so as not to move in the longitudinal direction of the straight notch. As with the aforementioned assembly, the assembly described in this publication does not include any suggestion on attachment of a footrest plate. In particular, this assembly is intended to detachably hold the garnish, and is unsuited for a measure for reducing the rotational or wobbling movement of a footrest plate.

It is therefore an object of the present invention to provide a footrest plate and a footrest plate mounting assembly capable of reducing rotational or wobbling movement of the footrest plate attached to a vehicle body or the like while maintaining a simple attaching operation for the footrest plate.

SUMMARY OF THE INVENTION

In order to achieve the above object, the present invention provides an elongated footrest plate having a footrest side and a rear side opposite to the footrest side, and the rear side is provided with a pair of clips to be fixedly received into a pair of corresponding mounting holes formed in a workpiece such as a vehicle body. The pair of clips are disposed with leaving a certain distance therebetween in the longitudinal direction of the footrest plate, in alignment with the pair of corresponding mounting holes disposed with leaving a certain distance therebetween. Each of the clips has a rectangular cross-sectional insertion portion insertable into corresponding one of the mounting holes each formed in a rectangular shape. In this footrest plate, the rear side is provided with a reference protrusion at an intermediate position between the pair of clips disposed with leaving the certain distance therebetween in the longitudinal direction. The reference protrusion is insertable into a reference hole formed in the workpiece. Further, the reference protrusion is formed in a rectangular cross-section defining a pair of lateral sides each of which extends in a lateral direction intersecting the longitudinal direction and has a length greater than that of each lateral side of the clips extending in the lateral direction.

According to the present invention, there is also provided a footrest plate mounting assembly for attaching an elongated footrest plate to a workpiece such as a vehicle body. The workpiece is formed with a pair of rectangular mounting holes disposed with leaving a certain distance therebetween at respective positions for mounting the footrest plate thereon. The footrest plate has a footrest side and a rear side opposite to the footrest side, and the rear side is provided with a pair of clips disposed with leaving a certain distance therebetween in the longitudinal direction of the footrest plate, in alignment with the pair of corresponding mounting holes. Each of the clips has a rectangular cross-sectional insertion portion insertable into corresponding one of the mounting holes each formed in a rectangular shape. In this footrest plate mounting assembly, the workpiece is formed with a reference hole at an intermediate position between the pair of mounting holes, and the rear side of the footrest plate includes a reference protrusion insertable into the reference hole. The reference protrusion is provided at an intermediate position between the pair of clips disposed with leaving the certain distance therebetween in the longitudinal direction, and in alignment with the reference hole. The reference hole is formed in a rectangular hole defining a pair of lateral sides each of which extends in a lateral direction intersecting the longitudinal direction and has a length greater than that of each lateral side of the mounting holes extending in the lateral direction. Further, the reference protrusion is formed in a rectangular cross-section defining a pair of lateral sides each of which extends in the lateral direction and has a length greater than that of each lateral side of the clips extending in the lateral direction.

According to the above footrest plate and the footrest plate mounting assembly of the present invention, the reference protrusion insertable into the reference hole of the workpiece is provided at the intermediate position between the pair of clips disposed with leaving the certain distance therebetween in the longitudinal direction, and the reference protrusion insertable into the reference hole is formed in a rectangular cross-section defining the pair of lateral sides having the length greater than that of each lateral side of the clips. Thus, even if a driver or other passenger braces his/her foot and a heavy load is applied to move the footrest plate, the reference protrusion is hardly moved in the reference hole to keep in its fixed position, and the reference protrusion extends in the lateral direction broader than the clips so as to prevent the rotational movement of the footrest plate. This makes it possible to attach the footrest plate only by inserting clips into the mounting hole without any tool or maintain a simple operation as with the conventional footrest plate, and to suppress or prevent the rotational or wobbling movement of the attached footrest plate.

In the above footrest plate or footrest plate mounting assembly, each of the insertion portions of the pair of clips may define a pair of longitudinal sides each of which extends in the longitudinal direction and has a length shorter than that of each longitudinal side of the mounting holes extending in the longitudinal direction by a clearance calculated based on the position of the reference protrusion. Thus, the amount of clearance to be set in each of the clips can be reduced.

Further, the reference protrusion may include an insertion portion insertable into the reference hole, which defines a pair of lateral sides each of which extends in the lateral direction and has a length shorter than that of each lateral side of the reference holes extending in the lateral direction by a clearance of the reference hole. This allows the misalignment caused by the tolerance of the reference hole to be compensated.

BRIEF DESCRIPTION OF THE DRAWINGS

FIGS. 1A–1C are explanatory views showing a conventional footrest plate and the condition after the conventional footrest plate is attached to a workpiece, wherein FIG. 1A is a top plan view of the conventional footrest plate, FIG. 1B is a front view of the conventional footrest plate, and FIG. 1C is an explanatory view showing the relationship between clips of the conventional footrest plate and mounting holes of the workpiece.

FIG. 2A is an explanatory view showing the relationship between the clips and the mounting holes in the condition after the conventional footrest plate of FIG. 1A-1C is attached to the workpiece, in conjunction with a driver's foot, and FIG. 2B is an explanatory view of a wobbling movement in the attached footrest plate.

FIGS. 8A–8C are explanatory views showing the condition after the footrest plate according to the present invention is attached to the workpiece according to the present invention without wobbling movement, wherein FIG. 8A shows the relationship between the clips and the mounting holes in the condition after the footrest plate according to the present invention is attached to the workpiece according to the present invention, in conjunction with a driver's foot, and FIG. 8B shows the condition after the footrest plate is attached to the workpiece without wobbling movement, and FIG. 8C is an enlarged view of the area enclosed with the circle C in FIG. 8B.

DETAILED DESCRIPTION OF THE PREFERRED EMBODIMENT

Figure 7:
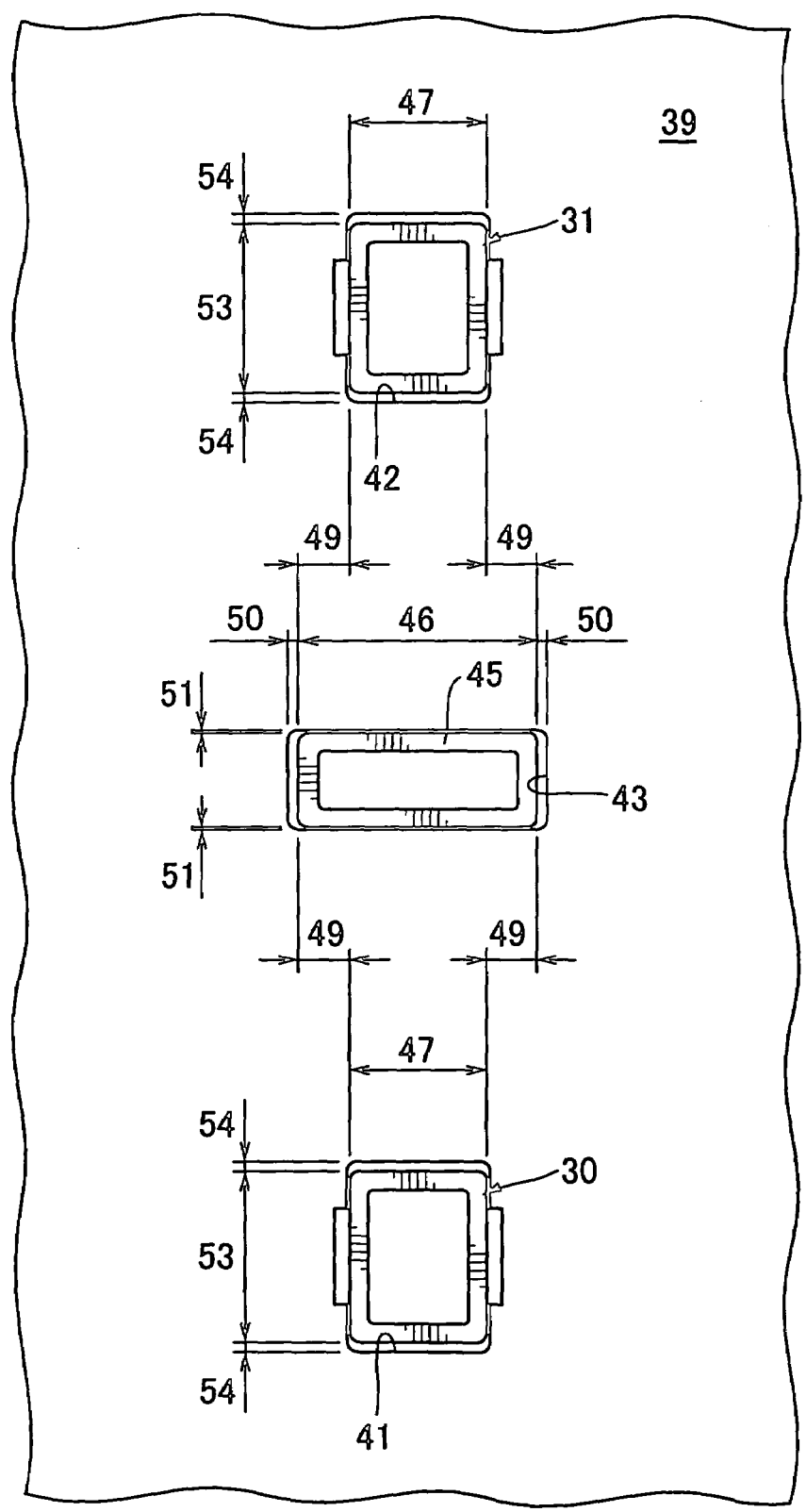
FIG. 7 is an explanatory view showing the relationship between clips of the footrest plate according to the present invention and mounting holes of a workpiece according to the present invention.

With reference to the drawings, an embodiment of the present invention will now be described. FIGS. 3 to 6 show a footrest plate 21 according to one embodiment of the present invention. FIG. 7 shows the relationship between mounting holes of a workpiece and clips of the footrest plate. In FIGS. 3 to 6, the footrest plate 21 is made of an elongated rectangular-shaped plastic plate member. The footrest plate has a front surface serving as a footrest side 22 formed with a large number of protrusions 23 for preventing a foot of a driver or other passenger from slipping. The rear side 25 of the footrest plate opposite to the footrest side 22 is formed in a ribbed assembly for weight reduction. Specifically, in order to maintain the strength of the footrest plate 21, a peripheral rib 26 is formed to surround the outer periphery of the footrest plate, and longitudinal and lateral center ribs 27 and 29 are formed along the longitudinal and lateral axes of the footrest plate 21, respectively. A pair of clips 30 and 31 to be fixedly received into corresponding mounting holes formed in a workpiece such as a vehicle body or a seat member fixed to the vehicle body are protrudingly provided on the rear side 25 opposite to the footrest side 22.

Figure 3:
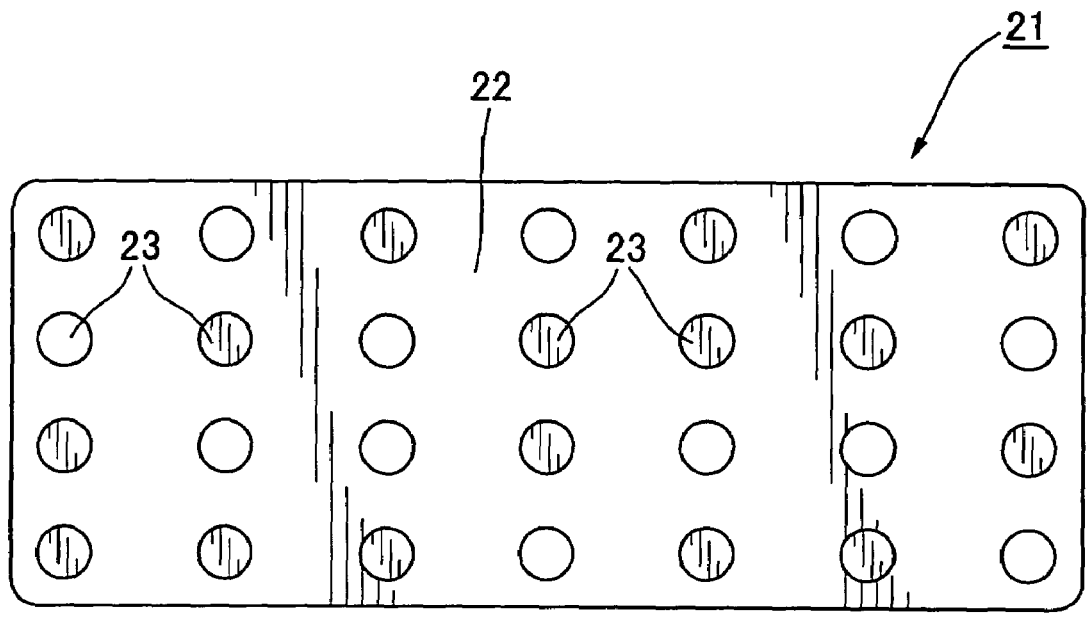
FIG. 3 is a top plan view of a footrest plate according to one embodiment of the present invention.
Figure 4:
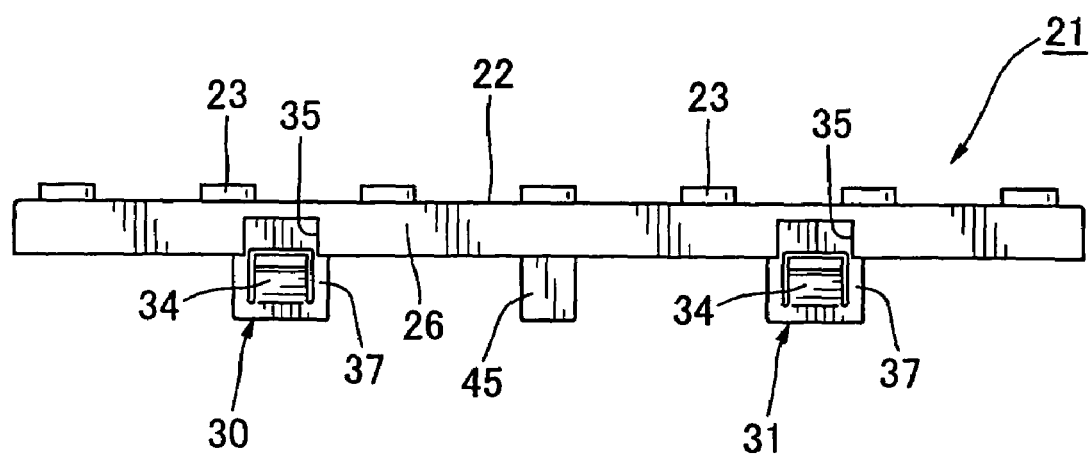
FIG. 4 is a front view of the footrest plate of FIG. 3.

As illustrated in FIGS. 3 to 6, for allowing the pair of clips 30 and 31 to be inserted into a pair of corresponding mounting holes formed in the workpiece with leaving a certain distance therebetween, the clips 30 and 31 are disposed at appropriately balanced positions of the rear side 25 of the footrest plate 21 in conformity with the distance between and the positions of the pair of mounting holes. The pair of clips 9 and 10 are integrally formed with the footrest plate 21. Each of the clips 30 and 31 is integrally formed with the footrest plate 21, and disposed between and supported by a pair of support ribs 33 extending in parallel with the lateral center rib 29. Each of the clips 30 and 31 is a conventional anchor clip having a pair of engagement pawls 34 on the side surface thereof. In order to form these engagement pawls 34, the peripheral rib 26 has notches 35 at the positions thereof corresponding to the clips 30 and 31, as shown in FIG. 4.

Figure 5:
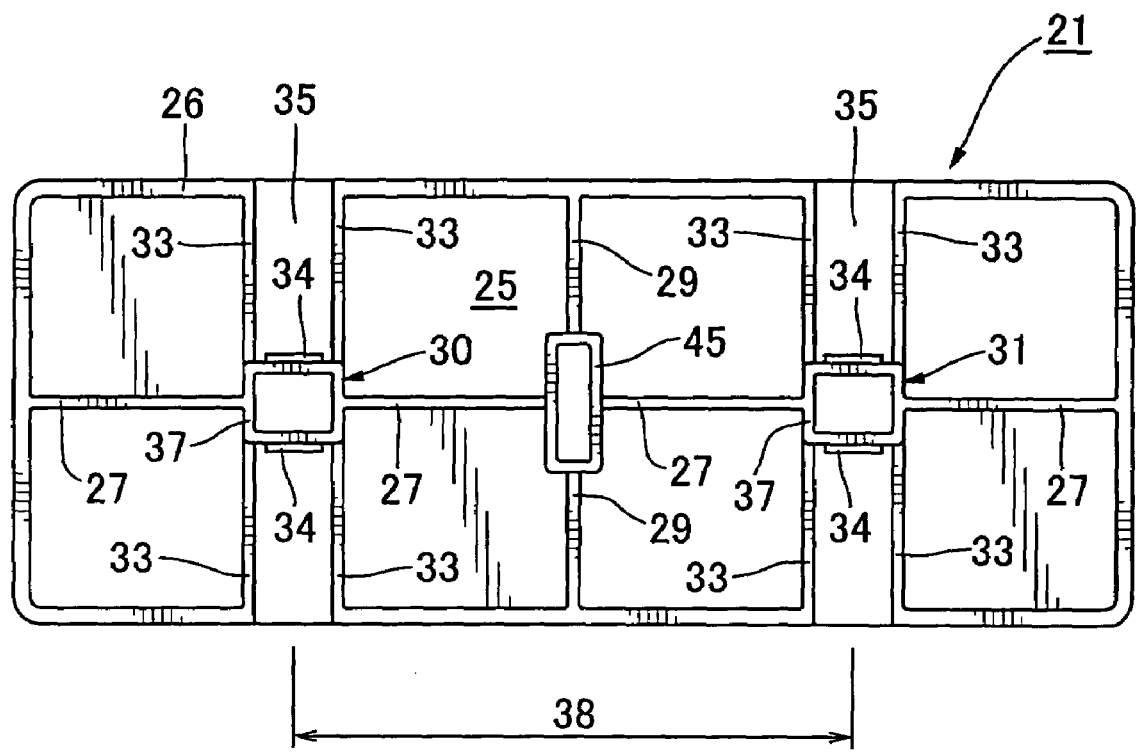
FIG. 5 is a bottom view of the footrest plate of FIG. 3.
Figure 6:
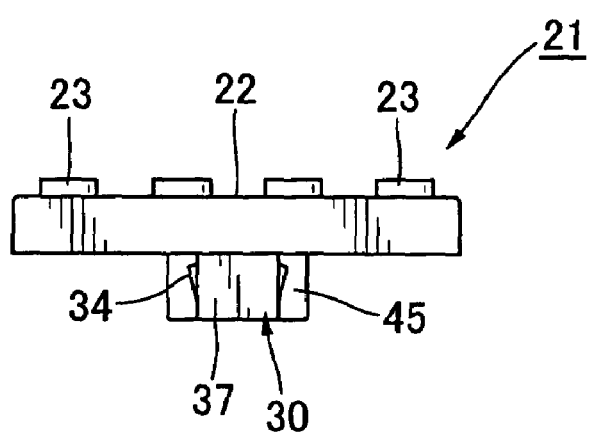
FIG. 6 is a left side view of the footrest plate of FIG. 3.

Each of the clips 30 and 31 includes a shank 37 having a rectangular cross-sectional insertion portion insertable into corresponding one of the mounting holes each formed in a rectangular shape. Each of the shanks 37 is formed in a hollow rectangular tube for weight reduction. As shown in FIG. 5, the pair of clips 30 and 31 are disposed on respective sides of the lateral center rib 29 at equal distances from the lateral center rib 29 and on the line of the longitudinal center rib 27. Further, the pair of clips 30 and 31 are disposed with leaving a distance 38 therebetween in the longitudinal direction of the footrest plate 21.

As shown in FIG. 7, the workpiece 39 is formed with a rectangular reference hole 43 at an intermediate position between the pair of mounting holes 41 and 42 disposed with leaving a certain distance therebetween. The footrest plate 21 is provided with a reference protrusion 45 having a rectangular cross section insertable into the reference hole 43, at an intermediate position between the pair of clips 30, 31 disposed with leaving the distance therebetween in the longitudinal direction. The reference hole 43 is formed in a rectangular hole defining a pair of lateral sides each having a length greater than that of each lateral side of the mounting holes 41, 42. The reference protrusion 45 is formed as a rectangular cross section defining a pair of lateral sides, each having a length greater than that of each lateral side of the clips 30, 31. As seen from FIGS. 4 to 6, the reference protrusion 45 is disposed at the center of the footrest plate 21 where the longitudinal and lateral center ribs 27 and 29 intersect with one another. The reference protrusion 45 is formed in a rectangular tubular body having a lateral length longer than each lateral side of the clips 30, 31 and a longitudinal length shorter than each longitudinal side of the clips 30, 31. As with the clips 30, 31, the reference protrusion 45 is integrally formed with the body of the footrest plate.

Returning to FIG. 7, each of the lateral sides of the reference protrusion 45 has a length 46 greater than a length 47 of each lateral side of the clips 30, 31. As illustrated, each length 46 of the lateral sides of the reference protrusion 45 is arranged to be longer than each length 47 of the lateral sides of the clips by twice (two times) the length 49 which is allocated equally on the respective sides of each of the lateral sides of the reference protrusion 45. Further, each length 46 of the lateral sides of the reference protrusion 45 is arranged to be shorter than each length of the lateral sides of the reference hole 43 by a lateral clearance 50 to compensate the tolerance of the reference hole 43. Similarly, each length of the longitudinal sides of the reference protrusion 45 is arranged to be shorter than each length of the longitudinal sides of the reference hole 43 by a small longitudinal clearance 51 to compensate the tolerance of the reference hole 43. Thus, the reference protrusion 45 can compensate its misalignment relative to the reference hole 43 caused by the tolerance of the reference hole 43. The reference protrusion 45 and the reference 43 define a reference position for attaching the footrest plate 21.

As shown in FIG. 7, in each of the clips 30, 31, the insertion portion to be inserted into the corresponding mounting hole 41, 42 defines a pair of longitudinal sides, each of which extends in the longitudinal direction and has a length shorter than that of each longitudinal side of said mounting holes extending in the longitudinal direction by a clearance 54 relative to the corresponding mounting hole calculated based on the position of the reference protrusion. In this manner, each clearance of the clips is set based on the position of the reference protrusion 45. Thus, as compared to the conventional footrest plate in which the clearance of one clip is set based on the position of the other clip, the amount of clearance to be set in each of the clips can be reduced. Further, the clearance 54 is set in each of the clips 30, 31 disposed on both sides of the reference protrusion 45, based on the position of the reference protrusion 45 disposed at the intermediate position between the clips. This allows the clips to be formed in the same shape. On the other hand, in the conventional footrest plate, since a relatively large amount of clearance is set in one clip based on the position of the other clip, these clips cannot be formed in the same shape. The conventional clips 9 and 10 in FIG. 1C are different in shape.

The footrest plate 21 having the above construction can be attached to the workpiece 39 only by pushing the reference protrusion 45 into the reference hole 43 while aligning with one another, and pushing clips 30 and 31 into the corresponding mounting holes 41 and 42 while aligning with each other. Thus, the footrest plate can be attached to the workpiece through a simple operation without any tool or only by inserting the clips and the reference protrusion into the corresponding mounting holes and the reference hole, respectively. The present invention can minimize or prevent the rotational or wobbling movement of the footrest plate attached to the workpiece. This action will be described with reference to FIGS. 8A to 8C. As with the description on the conventional footrest plate in FIG. 2, FIGS. 8A to 8C show the clips 30, 31, the mounting holes 41, 42, the reference protrusion 45 and the reference hole 43 with upsizing them in an exaggerated form and with shortening the respective distances therebetween.

As shown in FIG. 8A, in the condition after the footrest plate 21 is attached to the workpiece 39, the clips 30, 31 and the reference protrusion 45 are generally located at the illustrated positions in alignment with the corresponding mounting holes 41, 42 and the reference hole 43. In this condition, when a driver or other passenger braces his/her foot with placing the foot 11 on the footrest plate 21, a heavy load is applied to the footrest 21 in the direction shown by the arrow 13 as in FIG. 2A. Then, this load moves the entire footrest plate leftward, as shown FIG. 8B. Specifically, the clip 30 is brought into contact with the left edge of the mounting hole 41, and the clip 31 is brought into contact with the left edge of the mounting hole 42. The reference protrusion 45 is moved leftward within the range of the clearance 50 between the reference protrusion 45 and the reference hole 43. The load 13 also acts to move the footrest plate 21 toward the upper side of FIG. 8B. However, the reference protrusion is brought into contact with the upper edge of the reference hole 43 to prevent the footrest plate 21 from moving upward. In this condition, when observing the action of a force caused by the load 13 to the footrest plate on the assumption that the rotation center is located at the point 55 in FIG. 8B, the reference protrusion 45 in contact with the upper edge of the reference hole at the point 57 acts to prevent the rotational movement of the footrest plate as shown in FIG. 8C, because each of the lateral sides of the reference protrusion 45 protrudes from each end of the lateral sides by the length 49. Thus, the rotational or wobbling movement of the footrest plate 21 is minimized or prevented.

According to the present invention, the reference protrusion insertable into the reference hole of the workpiece is provided at the intermediate position between the pair of clips disposed with leaving the certain distance therebetween in the longitudinal direction, and the reference protrusion insertable into the reference hole is formed in a rectangular cross-section defining the pair of lateral sides having the length greater than that of each lateral side of the clips. Thus, even if a driver or other passenger braces his/her foot and a heavy load is applied to move the footrest plate, the reference protrusion is hardly moved in the reference hole to keep in its fixed position, and the reference protrusion extends in the lateral direction broader than the clips so as to prevent the rotational movement of the footrest plate. This makes it possible to attach the footrest plate only by inserting clips into the mounting hole without any tool or maintain a simple operation as with the conventional footrest plate, and to suppress or prevent the rotational or wobbling movement of the attached footrest plate.

I claim:

1. An elongated footrest plate, comprising:
   a first side and an oppositely facing second side;
   first and second clips extendable from the second side, each of the first and second clips including a rectangular shaped portion having a first parallel pair of sides longer than a second parallel pair of sides;
   a protrusion extending from the second side, the protrusion positioned between the first and second clips, the protrusion including a rectangular shaped body having a first pair of parallel walls longer than a second pair of parallel walls, the first pair of parallel walls oriented transverse to the first parallel pair of sides of the first and second clips; and
   a rib outwardly extending from and centrally disposed on the second side and extending in a longitudinal direction of the footrest plate;
   wherein the first and second clips are coaxially aligned with the rib in the longitudinal direction of the footrest.

2. The footrest of claim 1, wherein the first parallel pair of sides are substantially parallel to the rib.

3. The footrest of claim 1, wherein each of the first and second clips define an integral co-molded extension of the footrest plate.

4. The footrest of claim 1, wherein the protrusion is centrally positioned between the first and second clips and further defines an integrally formed extension of the second side of the footrest plate.

5. The footrest of claim 1, further comprising a plurality of raised, substantially circular protrusions extending outwardly from the first side.

6. A footrest plate system, comprising:
   a footrest plate having a first side and an oppositely facing second side;
   first and second clips extendable from the second side, each of the first and second clips including a rectangular shaped portion having a first parallel pair of sides longer than a second parallel pair of sides;
   a protrusion extending from the second side, the protrusion centrally positioned between the first and second clips, the protrusion including a rectangular shaped body having a first pair of parallel walls longer than a second pair of parallel walls, the first pair of parallel walls oriented transverse to the first parallel pair of sides of the first and second clips;

a workpiece having first, second and third rectangular-shaped mounting apertures, the first mounting aperture operable to receive the rectangular shaped portion of the first clip and the second mounting aperture operable to receive the rectangular shaped portion of the second clip; and a length of the first parallel pair of sides of the first and second clips is greater than a width of the second pair of parallel walls of the protrusion;

wherein the third aperture is centrally positioned between the first and second apertures, and is oriented to receive the protrusion, engagement of the protrusion with the third aperture being operable to substantially prevent rotation of the first and second clips relative to the workpiece.

7. The system of claim 6, further comprising:

a length of the first and second mounting apertures is greater than the length of the first parallel pair of sides of the first and second clips;

wherein a first clearance defined between the first and second clips and the first and second mounting apertures corresponds to a position of the protrusion.

8. The system of claim 7, further comprising:

a width of the third mounting aperture in a longitudinal direction of the footrest plate is greater than a width of the protrusion in the longitudinal direction operable to define a second clearance between the third mounting aperture and the protrusion;

wherein the second clearance is less than the first clearance.

9. The system of claim 6, further comprising:

a predefined distance operably separating the first and second clips;

wherein the first and second mounting apertures are separable by the predefined distance to operably permit engagement of the first and second clips with the first and second mounting apertures.

10. The system of claim 6, wherein a length of the first pair of parallel walls of the protrusion is greater than a width of the second parallel pair of sides of the first and second clips.

11. A footrest plate system, comprising:

a footrest plate having a first side and an oppositely facing second side;

first and second clips extendable from the second side, each of the first and second clips including a rectangular shaped portion having a first parallel pair of sides longer than a second parallel pair of sides;

a protrusion extending from the second side, the protrusion centrally positioned between the first and second clips, the protrusion including a rectangular shaped body having a first pair of parallel walls longer than a second pair of parallel walls, the first pair of parallel walls oriented transverse to the first parallel pair of sides of the first and second clips;

a workpiece having first, second and third rectangular-shaped mounting apertures, the first mounting aperture operable to receive the rectangular shaped portion of the first clip and the second mounting aperture operable to receive the rectangular shaped portion of the second clip; and a rib outwardly extending from and centrally disposed on the second side and extending in a lateral direction of the footrest plate;

wherein the third aperture is centrally positioned between the first and second apertures, and is oriented to receive the protrusion, engagement of the protrusion with the third aperture being operable to substantially prevent rotation of the first and second clips relative to the workpiece.

12. The system of claim 11, wherein the first and second clips are coaxially aligned with the rib in the longitudinal direction of the footrest.

* * * * *